United States Patent
Sanghera et al.

[11] Patent Number: 5,953,478
[45] Date of Patent: Sep. 14, 1999

[54] METAL-COATED IR-TRANSMITTING CHALCOGENIDE GLASS FIBERS

[75] Inventors: Jasbinder S. Sanghera, Greenbelt, Md.; Pablo C. Pureza, Burke; Ishwar Aggarwal, Fairfax Station, both of Va.

[73] Assignee: The United States of America as represented by the Secretary of the Navy, Washington, D.C.

[21] Appl. No.: 08/885,668

[22] Filed: Jun. 30, 1997

[51] Int. Cl.⁶ .................................................. G02B 6/22
[52] U.S. Cl. ........................ 385/123; 385/128; 385/144
[58] Field of Search .................................... 385/123, 144, 385/145, 128

[56] References Cited

U.S. PATENT DOCUMENTS

| | | | |
|---|---|---|---|
| 4,737,012 | 4/1988 | Murakami et al. | 385/142 |
| 4,828,354 | 5/1989 | Yoshida | 385/142 |
| 4,865,418 | 9/1989 | Takahashi et al. | 385/142 |
| 4,874,222 | 10/1989 | Vacha et al. | 385/142 |
| 4,938,562 | 7/1990 | Vacha et al. | 385/142 |
| 4,974,932 | 12/1990 | Nattermann et al. | 385/124 |
| 4,978,376 | 12/1990 | Takahashi et al. | 65/388 |
| 5,374,266 | 12/1994 | Kataoka et al. | 606/15 |
| 5,378,664 | 1/1995 | Becker et al. | 501/40 |

OTHER PUBLICATIONS

Sanghera et al., *SPIE* vol. 2396 (1995) 71–77.

*Primary Examiner*—John D. Lee
*Assistant Examiner*—Ellen E. Kong
*Attorney, Agent, or Firm*—Thomas E. McDonnell; Barry A. Edelberg

[57] ABSTRACT

Chalcogenide glass fibers are coated with metals. The products have improved bending strength and resistance to UV, visible light, and moisture. The metal coating may be applied by any method, such as dip coating or sputtering. Typical metals include In, Sn, Bi, Pb, Tl, Zn, Cd and C.

10 Claims, 1 Drawing Sheet

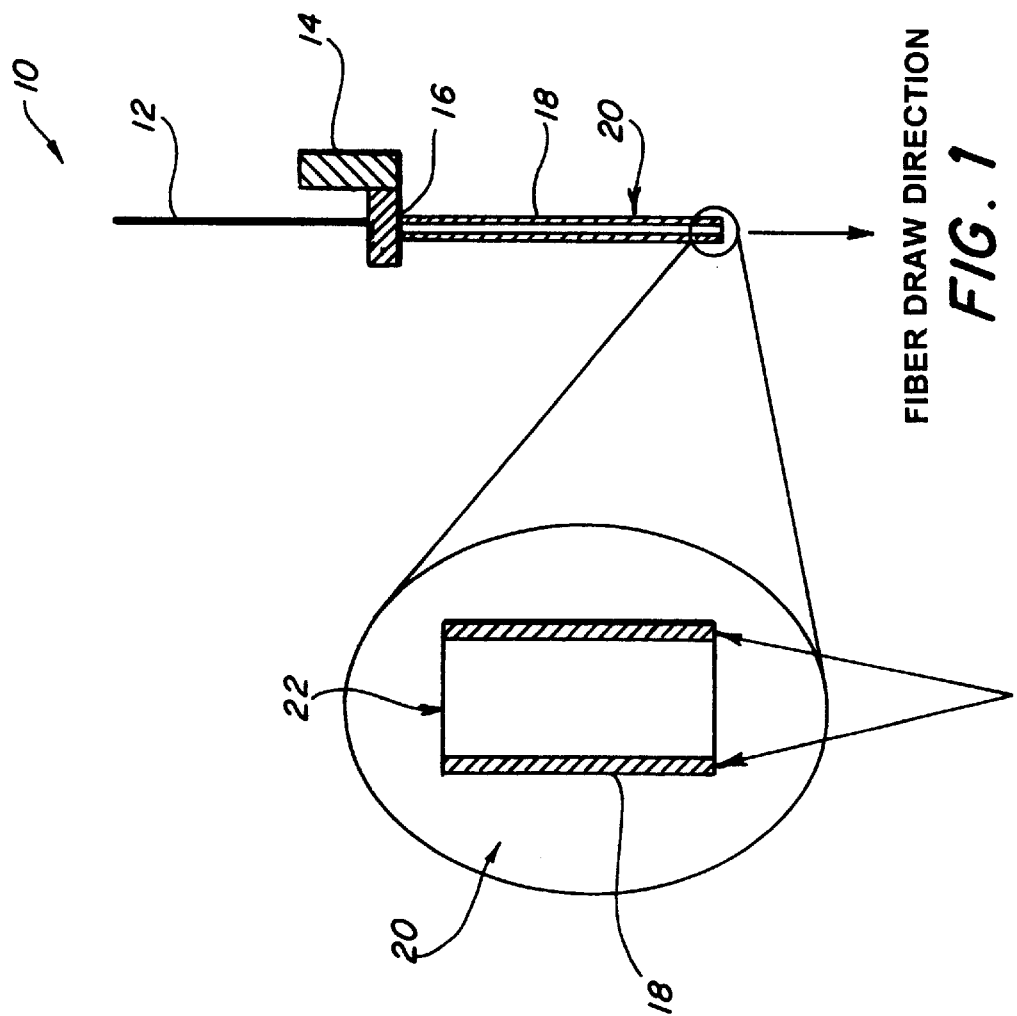

METAL-COATED IR-TRANSMITTING CHALCOGENIDE GLASS FIBERS

BACKGROUND OF THE INVENTION

1. Field of the Invention

The present invention relates generally to chalcogenide glass fibers, and more specifically, to the protection of chalcogenide glass fibers from the environment.

2. Background of the Invention

Currently there is great interest in IR transmitting glass fibers based on the chalcogen elements S, Se and Te. This is because, depending upon composition, these fibers transmit in the so-called "fingerprint" region between 2–12 $\mu$m where practically all molecular species possess characteristic IR vibrational bands. Therefore, these fibers can be used in fiber optic chemical sensor systems using evanescent, absorption or diffuse reflectance types of probes for DOD facility clean up. In addition, these fibers are required for laser threat warning systems, IRCM and high energy IR (especially the 2–5 $\mu$m region) laser power delivery systems to enhance aircraft survivability. In addition, these low-phonon energy chalcogenide glasses are excellent host materials for rare-earth doping. Fluorescence and laser transitions beyond 2 $\mu$m are possible in these materials which might not be seen in other high energy phonon host materials such as silica and fluoride glass fibers due to multiphonon absorption. In addition, radiative emission at shorter wavelengths is enhanced. Doped chalcogenide glasses can be used in IR scene projection for IRCM systems as well as 1.3 $\mu$m fiber amplifiers for telecommunications and fiber optic chemical sensor systems. In addition, numerous other applications exist for the systems.

For many practical applications, long-term mechanical strength is critical. While the chalcogenide glass fibers possess usable as-produce strengths, the long term durability and survivability of these fibers are problematic. Although chalcogenide glasses are chemically durable and do not exhibit a reaction with water, to some extent all fibers (including silica) undergo zero-stress aging and stress corrosion due to the presence of moisture. The water molecules attack the strained chemical bonds at the crack tips present on the fiber surface, causing a reduction in the fiber strength.

In addition, chalcogenide glasses are small band gap materials. It has been demonstrated that thin films of chalcogenide glass such as $As_2S_3$ and $As_2Se_3$ undergo both reversible and irreversible photo-structural changes in the presence of near band gap light, e.g., UV light and visible light. In the presence of air and moisture, the fiber surface becomes noticeably degraded with the subsequent catastrophic effect on the fiber mechanical strength. While UV light is above the band gap of these materials and therefore leads to enhanced degradation, researchers have observed similar degradation over a period of several months after exposing the fibers to ambient light in a laboratory. Therefore, there is a need to protect the chalcogenide fibers from UV, visible light, and moisture to prevent surface degradation and subsequent degradation of fiber strength.

SUMMARY OF THE INVENTION

Accordingly, it is an object of this invention to improve the long term durability of chalcogenide glass fibers.

It is another object of the present invention to protect it chalcogenide glass fibers from exposure to moisture.

It is a further object of the present invention to protect chalcogenide glass fibers from exposure to UV light.

These and other objects are accomplished by providing a metal coating on the surface of a chalcogenide glass fiber.

BRIEF DESCRIPTION OF THE DRAWINGS

A more complete appreciation of the invention will be readily obtained by reference to the following Description of the Preferred Embodiments and the accompanying drawings in which like numerals in different figures represent the same structures or elements, wherein:

FIG. 1 schematically illustrates an apparatus for coating a chalcogenide fiber with metal according to the present invention.

FIG. 2 schematically illustrates a metal-coated chalcogenide fiber according to the present invention.

DESCRIPTION OF THE PREFERRED EMBODIMENTS

As those skilled in the art know, chalcogenide glasses comprise at least one of the chalcogenide elements S, Se and Te and typically further include at least one of Ge, As, Sb, Tl, Pb, Si, P, Ga, In Cl, Br and I. Such glasses can also contain one or more rare earth elements. Chalcogenide glass typically contains at least about 25 mole % and more generally at least 50 mole % of one or more of the three chalcogenide elements. Typical chalcogenide glass compositions (atomic %) include:

$AS_{40}S_{60}$ $AS_{40}Se_6$ $Ge_{33}As_{12}Se_{55}$ $Ge_{30}As_{10}Se_{30}Te_{30}$ $Ge_{30}As_{10}Se_{30}Te_{20}I_{10}$; and $30Ga_2S_3.70La_2S_3$ The chalcogenide glass may be coated with metal by any method. For example, a glass fiber may be coated by drawing it through a melt or by sputtering. Typically, to prevent difficulties presented by differential thermal expansion and softening temperature mismatch between the metal coating, the drawn fiber, rather than the preform, is coated with metal. If the coating is applied to the fiber as a melt, the metal coating preferably has a softening temperature below the softening temperature of the glass fiber to be coated. Typical chalcogenide fibers (such as $As_2S_3$) have melting temperatures of about 200° C. to about 600° C. When the metal coating is applied to the fiber as a melt, the rate of cooling is not critical. Typically, cooling occurs quickly after the fiber has been coated with the melt.

Preferably, the metal coating is non-reactive, or essentially non-reactive, with the environment to which the fiber will be exposed. In most cases, this preference for non-reactivity translates into a preference for refractory metals, i.e., metals that are strongly resistant to destructive oxidation. Typically, most metals and alloys undergo surface oxidation, that is, these materials undergo structural as well as chemical changes as a result of exposure to an oxidizing environment. The rate of this change is highly dependent on the reactivity of the metal to the surrounding atmosphere and to the temperature. It is implied here that even metals which undergo self-limited surface oxidation of a monolayer (sometimes described as the growth of a protective oxide layer) or so can be used as fiber protective coatings, provided that these metals do not exhibit continuous degradation (i.e., destructive oxidation such as occurs with iron). Thus, in the specification and the claims that follow, the term "oxidation resistant metal" includes noble metals (e.g., gold, silver, platinum), as well as metals such as Zn, which display self-limiting growth of a protective oxide layer. Typical metals useful in the present invention include, but are not limited to In, Sn, Bi, Pb, Tl, Cd, Zn, and C (C must be applied to the glass fiber by other than a melt-coating process), and alloys thereof. In addition, gallium can be readily alloyed with the aforementioned 1F z metals and other higher melting metals such as Zn to form a low melting alloy suitable for fiber coating application.

FIG. 1 schematically illustrates a typical apparatus 10 useful for forming metal-coated chalcogenide glass fibers according to the present invention. Uncoated chalcogenide fiber 12 passes through crucible 14 containing molten metal for coating chalcogenide fiber 12. The bottom of container 14 includes an exit hole 16 slightly larger than the diameter of the coating. The amount by which the diameter of exit hole 16 exceeds the diameter of fiber 12 determines, for the most part, the diameter of the metal coating 18 formed on metal-coated fiber 20 that exits container 14. FIG. 2 shows, in greater detail, metal-coated fiber 20, with chalcogenide glass interior 22 surrounded by metal coating 18.

The metal coating may be applied at any thickness. Typical metal coating thickness, however, are from about 1 $\mu$m to about 50 $\mu$m. The preferred coating thickness is about 1 $\mu$m to about 10 $\mu$m. The most preferred coating thickness is about 1 to about 5 $\mu$m.

Having described the invention, the following examples are given to illustrate specific applications of the invention including the best mode now known to perform the invention. These specific examples are not intended to limit the scope of the invention described in this application.

EXAMPLES

Example 1

An $As_{40}S_{58}Se_2$ glass rod was used with a length of approximately 10 cm and a diameter of 6 mm. Fiber was subsequently drawn from the rod on a draw tower located in a class 100 clean room. The fiber was drawn at around 310° C. and at a rate of approximately 4 m/min. The fiber traveled through a container of indium metal at above its melting point, in this case 170° C. As the fiber left the bottom of the indium melt it possessed a thin, smooth coating of indium metal. The fiber diameters ranged in size from about 100–240 $\mu$m and the indium coating ranged in thickness from a few microns to 50 $\mu$m. The coating thickness can be increased or decreased by controlling the fiber draw speed and the indium melt temperature and pressure.

Preliminary strength results indicate that chalcogenide glass fibers with a 50 $\mu$m thick indium coating exhibited bending strengths of 240 to 386 kpsi (1.66 to 2.66 Gpa) in air under ambient conditions. The results are listed in Table 1 and compared with results for Teflon FEP coated fibers. The fibers coated with a Teflon. FEP clad exhibited strengths in the range of 63–95 kpsi in air and 107–179 kpsi in liquid nitrogen. Measurement in liquid nitrogen inhibits stress corrosion and therefore results in higher strength than in air. Remarkably, the indium metal coated fiber exhibited strengths approximately two-fold higher than the Teflon FEP coated fiber strength measured in liquid nitrogen.

TABLE 1

| The strength of In metal-coated and Teflon-coated chalcogenide fibers | | | |
|---|---|---|---|
| Fiber | Type of Coating | Strength in air (kpsi) | Strength in liquid nitrogen (kpsi) |
| Chalcogenide | Teflon | 63–95 | 107–179 |
| Chalcogenide | Indium | 240–386 | — |

Obviously, many modifications and variations of the present invention are possible in light of the above teachings. It is therefore to be understood that, within the scope of the appended claims, the invention may be practiced otherwise than as specifically described.

What is claimed is:

1. A metal-coated chalcogenide glass fiber comprising an interior of chalcogenide glass surrounded by an oxidation-resistant metal coating in physical contact with said chalcogenide glass, said oxidation-resistant metal coating having a melting temperature that is below the softening temperature of said chalcogenide glass.

2. The metal-coated chalcogenide glass fiber of claim 1, wherein said metal coating is selected from the group consisting of In, Sn, Bi, Pb, Tl, Cd, Zn and alloys having In, Sn, Bi, Pb, Tl, Cd, or Zn as a base metal.

3. The metal-coated chalcogenide glass fiber of claim 1, wherein said chalcogenide glass includes at least about 25 mole % of S, Se and Te.

4. The metal-coated chalcogenide glass-fiber of claim 3, wherein said chalcogenide glass includes at least about 50 mole % of S, Se and Te.

5. The metal-coated chalcogenide glass fiber of claim 3, wherein said chalcogenide glass further includes Ge, As, Sb, Tl, Pb, Si, P, Ga, In Cl, Br or I.

6. A method of protecting a chalcogenide glass fiber, comprising the step of surrounding a chalcogenide glass fiber with an oxidation resistant metal coating in contact with the chalcogenide glass of said chalcogenide fiber by drawing said chalcogenide glass fiber through a melt of said metal.

7. The method of claim 6, wherein said metal has a melting temperature that is lower than the melting temperature of said chalcogenide glass.

8. The method of claim 6, wherein said metal is selected from the group consisting of In, Sn, Bi, Pb, Tl, Cd, Zn, and alloys having In, Sn, Bi, Pb, Tl, Cd, or Zn as a base metal.

9. The method of claim 6, wherein said chalcogenide fiber is coated with said metal by sputtering.

10. The method of claims 6, wherein said chalcogenide glass is selected from the group consisting of $As_{40}S_{60}$, $As_{40}Se_6$, $Ge_{33}As_{12}Se_{55}$, $Ge_{30}As_{10}Se_{30}Te_{30}$, $Ge_{30}As_{10}Se_{30}Te_{20}I_{10}$; and $30Ga_2S_3.70La_2S_3$.

* * * * *